US011431650B2

(12) United States Patent
Kotalwar et al.

(10) Patent No.: US 11,431,650 B2
(45) Date of Patent: *Aug. 30, 2022

(54) MULTICAST BASED ON BIT INDEXED EXPLICIT REPLICATION

(71) Applicant: NOKIA TECHNOLOGIES OY, Espoo (FI)

(72) Inventors: Jayant Kotalwar, Cupertino, CA (US); Filip Martin, Antwerp (BE); Hooman Bidgoli, Ottawa (CA)

(73) Assignee: Nokia Technologies Oy, Espoo (FI)

( * ) Notice: Subject to any disclaimer, the term of this patent is extended or adjusted under 35 U.S.C. 154(b) by 8 days.

This patent is subject to a terminal disclaimer.

(21) Appl. No.: 16/778,271

(22) Filed: Jan. 31, 2020

(65) Prior Publication Data
US 2020/0195575 A1 Jun. 18, 2020

Related U.S. Application Data

(63) Continuation of application No. 15/718,210, filed on Sep. 28, 2017, now Pat. No. 10,574,589.

(51) Int. Cl.
*H04L 12/927* (2013.01)
*H04L 12/46* (2006.01)
(Continued)

(52) U.S. Cl.
CPC .......... *H04L 47/806* (2013.01); *H04L 12/185* (2013.01); *H04L 12/4633* (2013.01);
(Continued)

(58) Field of Classification Search
None
See application file for complete search history.

(56) References Cited

U.S. PATENT DOCUMENTS 9,832,031 B2 11/2017 Zhao
9,843,513 B2 12/2017 Nagarajan
(Continued)

FOREIGN PATENT DOCUMENTS

WO   WO-2016197999 A1 * 12/2016

OTHER PUBLICATIONS

Bidgoli, et al., "PIM Tunneling Through BIER Core," BIER Workgroup, Internet Draft, https://tools.ietf.org/pdf/draft-hfa-bier-pim-tunneling-00.pdf, 11 pages, Jun. 21, 2017.
(Continued)

*Primary Examiner* — Eunsook Choi
(74) *Attorney, Agent, or Firm* — Tong, Rea, Bentley & Kim, LLC

(57) ABSTRACT

The present disclosure generally discloses a multicast capability configured to support multicast that is based on use of Bit Indexed Explicit Replication (BIER). The multicast capability may be configured to support deployment of BIER into a network in a manner that continues to support use of Protocol Independent Multicast (PIM) for multicast control within the network. The multicast capability may be configured to support deployment of BIER, into a network including an Interior Gateway Protocol (IGP) area, using a BIER domain that is commensurate with the IGP area or that is only a portion of the IGP area. The multicast capability may be configured to support deployment of BIER into a network in a manner supporting stitching of traditional PIM access networks via a BIER core network.

24 Claims, 5 Drawing Sheets

(51) Int. Cl.
*H04L 47/80* (2022.01)
*H04L 49/201* (2022.01)
*H04L 45/16* (2022.01)
*H04L 12/18* (2006.01)
*H04L 45/02* (2022.01)

(52) U.S. Cl.
CPC .......... *H04L 12/4679* (2013.01); *H04L 45/16* (2013.01); *H04L 49/201* (2013.01); *H04L 45/04* (2013.01)

(56) References Cited

U.S. PATENT DOCUMENTS

| | | | |
|---|---|---|---|
| 2010/0329252 A1* | 12/2010 | Mulamalla | H04L 12/4641 370/390 |
| 2015/0078378 A1* | 3/2015 | Wijnands | H04L 12/18 370/390 |
| 2015/0085635 A1 | 3/2015 | Wijnands | |
| 2016/0254988 A1 | 9/2016 | Eckert | |
| 2016/0277463 A1 | 9/2016 | Nagarajan | |
| 2017/0126587 A1 | 5/2017 | Ranns et al. | |
| 2017/0317841 A1 | 11/2017 | Xu | |
| 2018/0205636 A1 | 7/2018 | Hu | |
| 2018/0287934 A1* | 10/2018 | Wang | H04L 12/4625 |
| 2019/0007225 A1* | 1/2019 | Nagarajan | H04L 12/185 |
| 2020/0245206 A1* | 7/2020 | Allan | H04L 45/04 |

OTHER PUBLICATIONS

Wijnands, et al., "Multicast using Bit Index Explicit Replication", Internet Engineering Task Force, https://tools.ietf.org/pdf/draft-ietf-bier-architecture-07.pdf, 38 pages, Jun. 21, 2017.
International Search Report and Written Opinion mailed in corresponding application PCT/US2018/051329 dated Dec. 19, 2018, 12 pages.

* cited by examiner

MULTICAST BASED ON BIT INDEXED EXPLICIT REPLICATION

CROSS-REFERENCE TO RELATED APPLICATIONS

This application is a continuation of U.S. patent application Ser. No. 15/718,210, filed on Sep. 28, 2017, entitled MULTICAST BASED ON BIT INDEXED EXPLICIT REPLICATION, which is hereby incorporated herein by reference.

TECHNICAL FIELD

The present disclosure relates generally to communication networks and, more particularly but not exclusively, to supporting multicast in communications networks.

BACKGROUND

Multicast is used in many types of communication networks to deliver various types of information. Multicast may be implemented in various ways. Bit Indexed Explicit Replication (BIER) is an architecture for supporting multicast. BIER has various advantages, such as being stateless and scalable. However, there are various challenges associated with deployment and use of BIER for multicast.

SUMMARY

The present disclosure generally discloses supporting multicast that is based on Bit Indexed Explicit Replication (BIER).

In at least some embodiments, an apparatus is provided. The apparatus is configured to support multicast based on BIER. The apparatus includes a processor and a memory communicatively connected to the processor. The processor is configured to receive, by a BIER border router of a BIER domain, a control message associated with a multicast group of a multicast source, wherein the BIER domain is an Interior Gateway Protocol (IGP) area. The processor is configured to determine, by the BIER border router, a border router which leaked a route to the multicast source into the BIER domain. In at least some embodiments, a non-transitory computer-readable storage medium stores instructions which, when executed by a computer, cause the computer to perform a corresponding method supporting multicast based on BIER. In at least some embodiments, a corresponding method supporting multicast based on BIER is provided.

In at least some embodiments, an apparatus is provided. The apparatus is configured to support multicast based on BIER. The apparatus includes a processor and a memory communicatively connected to the processor. The processor is configured to receive, by a BIER border router of a BIER domain, a control message associated with a multicast group of a multicast source, wherein the BIER domain is a portion of an Interior Gateway Protocol (IGP) area. The processor is configured to determine, by the BIER border router, a last BIER router on a path toward the multicast source. In at least some embodiments, a non-transitory computer-readable storage medium stores instructions which, when executed by a computer, cause the computer to perform a corresponding method supporting multicast based on BIER. In at least some embodiments, a corresponding method supporting multicast based on BIER is provided.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure generally discloses a multicast capability configured to support multicast that is based on use of Bit Indexed Explicit Replication (BIER). The multicast capability may be configured to support deployment of BIER into a network in a manner that continues to support use of Protocol Independent Multicast (PIM) for multicast control within the network. The multicast capability may be configured to support deployment of BIER, into a network including an Interior Gateway Protocol (IGP) area, using a BIER domain that is commensurate with the IGP area or that is only a portion of the IGP area. The multicast capability may be configured to support deployment of BIER into a network in a manner supporting stitching of traditional PIM access networks via a BIER core network. The multicast capability may be configured to support deployment of BIER into a network, in a manner supporting stitching of traditional PIM access networks via a BIER core network, based on signaling of PIM JOIN messages and PRUNE messages across the BIER core network using BIER tunnels. The multicast capability may be configured to support signaling of PIM JOINs and PRUNEs across the BIER core network, using BIER tunnels, using any suitable communication format (e.g., using PIM JOIN and PRUNE messages or using other communication formats configured to transport the information of the PIM JOINs and PRUNEs being signaled). In this manner, PIM JOINs and PRUNEs may be signaled between PIM access domains (e.g., from a PIM access domain associated with a multicast host to a PIM access domain associated with a multicast source). In other words, the multicast capability enables the core network to use BIER in order stitch together multiple access networks where the access networks may be traditional PIM networks which may be used within various contexts (e.g., Generic Routing Table (GRT), Multicast Virtual Private Network (MBPN), or the like). The multicast capability may be configured to allow the migration of a core network to a "lean core" (e.g., where a single IGP protocol or Software Defined Networking (SDN) controller could enable unicast and multicast services) and without a need for multicast states or use of Border Gateway Protocols (BGPs). It will be appreciated that these and various other embodiments and potential advantages of the multicast capability may be further understood by way of reference to the example communication system of FIG. 1.

Figure 1:
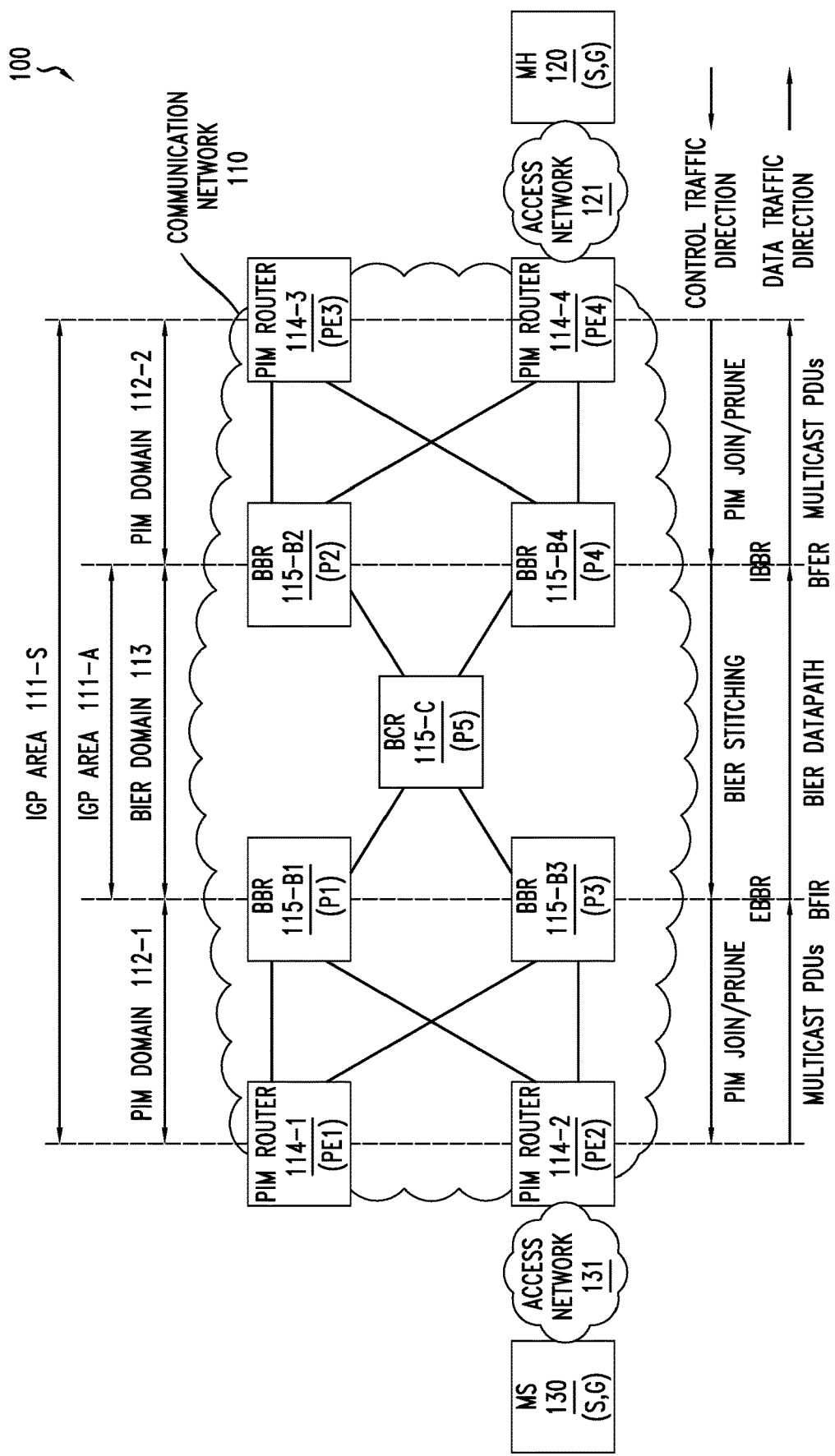
FIG. 1 depicts a communication system configured to support multicast based on a BIER core network and traditional PIM access networks.

FIG. 1 depicts a communication system configured to support multicast based on a BIER core network and traditional PIM access networks.

The communication system 100 includes a communication network (CN) 110 that is configured to support multicasting of traffic to a multicast host (MH) 120 from a multicast source (MS) 130.

The communication system 100 illustrates an arrangement in which multicast control traffic is propagated from right to left on the page (e.g., from the MH 120 toward the MS 130, via the CN 110, for enabling the MH 120 to join and leave multicast services) and in which multicast data traffic is propagated from left to right on the page (e.g., from the MS 130 toward the MH 120, via the CN 110, for enabling the MH 120 to receive multicast data traffic).

The CN 110 is composed of an Interior Gateway Protocol (IGP) area (which, illustratively, may be IGP area 111-A or IGP area 111-S), a pair of Protocol Independent Multicast (PIM) domains 112-1 and 112-2 (collectively, PIM domains 112), and a BIER domain 113. In at least some embodiments, the IGP area and the BIER domain 113 are commensurate in scope as the entire IGP area is implemented using BIER (illustrated in FIG. 1 using the IGP area 111-A indicator). In at least some embodiments, the IGP area and the BIER domain 113 are not commensurate in scope as only a portion of the IGP area is implemented using BIER (illustrated in FIG. 1 using the IGP area 111-S indicator, which illustrates that the BIER domain 113 is actually a BIER sub-domain that is only part of the IGP area 111-S). It will be appreciated that certain aspects of supporting multicast within the CN 110 may vary depending on whether the BIER domain 113 forms all or part of the IGP area.

The CN 110 includes a set of PIM routers 114-1-114-4 (collectively, PIM routers 114) operating within the PIM domains 112 and a set of BIER routers 115 operating within the BIER domain 113. The set of BIER routers 115 includes a set of BIER border routers (BBRs) 115-B1-115-B4 (collectively, BBRs 115-B) and a BIER core router (BCR) 115-C. The PIM routers 114-1 and 114-2 (operating in the PIM domain 112-1) are each connected to the BBRs 115-B1 and 115-B3 and the PIM routers 114-3 and 114-4 (operating in the PIM domain 112-2) are each connected to the BBRs 115-B2 and 115-B4. The BBRs 115-B are each connected to the BCR 115-C. The MH 120 is communicatively connected to PIM router 114-4 via an access network 121 and the MS 130 is communicatively connected to the PIM router 114-2 via an access network 131.

The PIM routers 114 are configured to facilitate communication between multicast endpoints (e.g., MS 130 and MH 120) and the BBRs 115-B of the BIER domain 113. The PIM routers 114 are configured to support communication of multicast control traffic in the control traffic direction based on multicast control protocols and communication of multicast data traffic in the data traffic direction based on multicast data protocols.

The PIM routers 114 are configured to support communications with multicast endpoints, including multicast hosts (e.g., the MH 120) and multicast sources (e.g., the MS 130). The PIM routers 114 are configured to support multicast control communications with multicast hosts and multicast sources using various multicast control protocols (e.g., Internet Group Management Protocol (IGMP) or the like). For example, PIM router 114-4 may receive IGMP Membership Reports from the MH 120. The PIM routers 114 are configured to support multicast data communications with multicast sources and multicast sources using various data transport protocols. For example, PIM router 114-2 may receive multicast data traffic from the MS 130 and PIM router 114-4 may send multicast data traffic to the MH 120. The PIM routers 114 may be configured to support multicast control and data communications with multicast hosts and multicast sources based on various other types of protocols.

The PIM routers 114 are configured to support communications with BBRs 115-B. The PIM routers 114 are configured to support multicast control communications using PIM, which may include communication of PIM control messages such as PIM JOINS, PIM PRUNEs, or the like, as well as various combinations thereof. The PIM routers 114 are configured to send PIM control messages to the BBRs 115-B. For example, the PIM router 114-4 may send PIM JOIN and PRUNE messages to the BBRs 115-B2 and 115-B4. For example, the PIM router 114-2 may receive PIM JOIN and PRUNE messages from the BBRs 115-B and 115-B3. The PIM routers 114 are configured to support multicast data communications using multicast data protocols. For example, the PIM router 114-2 may receive multicast data traffic from the MS 130 and send the multicast data to the BBR 115-B3. For example, the PIM router 114-4 may receive multicast data traffic from the BBR 115-B4 and send the multicast data to the MH 120. The communication of multicast data traffic between the PIM routers 114 and the BBRs 115-B may be based on multicast protocol data units (PDUs), which may be based on various transport protocols configured to transport multicast data traffic. The PIM routers 114 may be configured to support various other types of communications with BBRs 115-B.

The PIM routers 114 may be configured to support various other types of communications.

The BIER routers 115 are configured to support BIER, an architecture that, in general, provides multicast forwarding through a BIER domain (illustratively, BIER domain 113) without requiring intermediate routers to maintain multicast-related per-flow state and without requiring use of an explicit tree-building protocol. In general, in the BIER architecture for a BIER domain, a multicast data packet enters the BIER domain at a Bit-Forwarding Ingress Router (BFIR) and leaves the BIER domain at one or more Bit-Forwarding Egress Routers (BFERs) based on use of a BIER packet header that includes a Bit-String in which each bit represents one BFER (namely, the bits of the Bit-String are set in a manner indicating the one or more BFERs to which the multicast data packet is to be provided). In general, in the BIER architecture for a BIER domain, the BIER domain may be identified by a unique BIER domain identifier and can support multiple Bit-String Lengths. In general, in the BIER architecture for a BIER domain, the BIER routers of the BIER domain also may be referred to herein as Bit Forwarding Routers (BFRs), which are routers that participate in Bit Index Multipoint Forwarding. It is noted that a BFR is identified in a BIER domain or BIER sub-domain by a unique BFR-prefix. Various other aspects of the BIER architecture will be understood from the BIER architecture documents. The BBRs 115-B, as discussed above, are configured to support stitching of PIM through the BIER domain 113 and multicast forwarding of multicast data traffic through the BIER domain 113. The BBRs 115-B may be configured to support stitching of PIM through the BIER domain 113 such that the PIM domains 112 are stitched together and, thus, the legacy PIM multicast services of the PIM domains 112 are stitched together. The BBRs 115-B are configured to create PIM adjacency toward their respective PIM domains 112 for each of the routers in the respective PIM domains 112 (illustratively, BBRs 115-B1 and 115-B3 create PIM adjacency toward PIM routers 114-1 and 114-2 in PIM domain 112-1 and BBRs 115-B2 and 115-B4 create PIM adjacency toward PIM routers 114-3 and 114-4 in PIM domain 112-2) and are configured to terminate the PIM adjacency toward the BIER domain 113 (e.g., only signaling multicast desire for joining and pruning through the BIER domain 113). The BBRs 115-B may be configured to support signaling of PIM JOINs and PRUNEs across the BIER domain 113 using BIER tunnels. The BBRs 115-B may be configured to support signaling of PIM JOINs and PRUNEs across the BIER domain 113, using BIER tunnels, using any suitable communication format (e.g., using PIM JOIN and PRUNE messages or using other communication formats configured to transport the information of the PIM JOINs and PRUNEs being signaled via the BIER domain 113). In this manner, PIM JOINs and PRUNEs may be signaled between PIM access domains (illustratively, from the PIM domain 112-2 associated with MH 120 to the PIM domain 112-1 associated with MS 130). In other words, the BBRs 115-B do not propagate all PIM control messages natively into the BIER domain 113; rather, the BBRs 115-B, based on a determination that a PIM JOIN or PRUNE needs to be signaled through the BIER domain 113, tunnels the PIM JOIN or PRUNE through the BIER domain 113. In other words, this signaling of PIM JOINs and PRUNEs through the BIER domain 113 by BBRs 115-B is done for signaling purposes, not for creating a PIM adjacency between the two disjoint PIM domains 112-1 and 112-2 through the BIER domain 113. It is noted that such capabilities of the BBRs 115-B enables the migration of the BIER domain 113 to a "lean core" without a need for multicast states or use of BGP. The BBRs 115-B also may be configured to support multicast forwarding of multicast data traffic through the BIER domain 113 based on existing multicast data traffic handling capabilities of the BIER architecture. The BBRs 115-B may be configured to support various other functions as discussed further below.

The BBRs 115-B may be configured to operate as ingress border routers and as egress border routers of the BIER domain 113, where the mode of operation being used may vary depending on the locations of the BBRs 115-B relative to the multicast hosts and the multicast sources, the type of communications being supported (e.g., multicast control traffic versus multicast data traffic), or the like, as well as various combinations thereof.

Herein, unless indicated otherwise, the terms Bit Forwarding Ingress Router (BFIR) and Bit Forwarding Egress Router (BFER) are used in conjunction with handling of the multicast data traffic in the data traffic direction from the MS 130 toward the MH 120. In general, a BFIR is the ingress border router that inserts the multicast PDU into the BIER packet, and each BFIR has a valid BFR-ID assigned thereto. In general, a BFER is a router that participates in Bit Index Forwarding as a leaf, and each BFER must be a BFR and must have a valid BFR-ID assigned thereto. In other words, the BFIR and the BFER are the BBRs from the multicast traffic point of view. Namely, given that BIER is being used for forwarding of data plane traffic and stitching of control plane traffic (e.g., PIM), BFIR and BFER are the terms used for data plane packet forwarding (so as to distinguish them from other terms used for control plane stitching, which are discussed further below). For example, in the example of FIG. 1, BBR 115-B3 would be a BFIR and BBR 115-B4 would be a BFER.

Herein, unless indicated otherwise, the terms Ingress BBR (IBBR) and Egress BBR (EBBR) are used in conjunction with handling of the PIM control messages in the control traffic direction from the MH 120 toward the MS 130. In general, an IBBR is an ingress boundary router between a PIM domain (e.g., PIM domain 112-2) and a BIER domain (e.g., BIER domain 113) that receives PIM control messages from the PIM domain and signals the PIM control message through the BIER domain toward the multicast source (e.g., MS 130) using tunneling of control message via BIER tunnels. The IBBR is the ingress router from the PIM signaling point of view and is configured to determine whether PIM JOINs and PRUNEs need to be signaled across the BIER domain 113 and, if so, to terminate the PIM adjacency and signal the PIM JOINs and PRUNEs through the BIER domain 113. In general, an EBBR is an egress boundary router between a BIER domain (e.g., BIER domain 113) and a PIM domain (e.g., PIM domain 112-1) that receives control messages from BIER tunnels after tunneling of the control messages through the BIER domain toward the multicast source (e.g., MS 130) via BIER tunnels and sends corresponding PIM control message to the PIM domain. The EBBR is the egress router from the PIM signaling point of view and is configured to determine whether BIER packets are control packets signaling PIM JOINs or PRUNEs and, if so, to terminate the BIER packets signaling PIM JOINs and PRUNEs and forward the signaled PIM JOINs and PRUNEs into the PIM domain (e.g., PIM domain 112-1). In other words, the IBBR and the EBBR are the BBRs from the PIM signaling point of view. Namely, given that BIER is being used for forwarding of data plane traffic and stitching of control plane traffic (e.g., PIM), IBBR and EBBR are the terms used for control plane packet forwarding and tunneling (so as to distinguish them from other terms used for data plane packet forwarding, which are discussed further above). It is noted that the IBBR and the EBBR are configured to maintain the PIM adjacency toward the respective PIM domains 112 and to terminate the PIM adjacency toward the BIER domain 113. For example, in the example of FIG. 1, BBR 115-B4 would be an IBBR and BBR 115-B3 would be an EBBR.

The BBRs 115-B, as discussed above, may be configured to operate as ingress border routers and as egress border routers under various conditions. As discussed above, a BFIR would be an EBBR of the control plane traffic (e.g., BBR 115-B3) and a BFER would be an IBBR of the control plane traffic (e.g., BBR 115-B4). Similarly, as discussed above, an IBBR would be a BFER of the multicast data traffic (e.g., BBR 115-B4) and an EBBR would be a BFIR of the multicast traffic (e.g., BBR 115-B3).

The BBRs 115-B, given that the BIER domain 113 is an IGP area (which corresponds to the case of IGP area 111-A) or a portion of an IGP area (which corresponds to the case of IGP area 111-S), may be area border routers (ABRs) or autonomous system border routers (ASBRs) that are connected to the edge network (e.g., PIM routers 114) via an appropriate protocol (e.g., an IGP, A Border Gateway Protocol (BGP), or the like), provider (P) routers that are selected to operate as BIER border routers in the BIER domain 113, or the like, as well as various combinations thereof.

The BBRs 115-B are configured to support stitching of PIM signaling through, rather than communication of PIM control messages natively within, the BIER core network (i.e., the BIER domain 113) for PIM JOIN and PRUNE messages. The BBRs 115-B are configured to receive PIM JOIN and PRUNE messages from downstream routers and provide PIM JOIN and PRUNE messages to upstream routers, because the BBRs 115-B are on the path from the multicast host (e.g., MH 120) toward the multicast source (e.g., MS 130). The BBRs 115-B are configured such that the interfaces which are PIM-enabled are configured to support stitching of PIM signaling, for PIM JOIN and PRUNE messages, over a BIER core network, including switching between PIM and BIER (e.g., BBRs 115-B3 and 115-B4 are configured to terminate PIM of the PIM domain 112-2 and switch to BIER for the BIER domain 113 and BBRs 115-B1 and 115-B2 are configured to terminate BIER of the BIER domain 113 and switch to PIM for the PIM domain 112-1). It is noted that the BBRs 115-B will keep PIM adjacency toward the respective PIM domains 112 between the PIM routers 114.

The BBR 115-B that receives a PIM JOIN for the (S,G), that is indicative of a request by a multicast host to join the (S,G), is the IBBR 115-B for the PIM JOIN.

The IBBR 115-B that receives the PIM JOIN for the (S,G) is configured to, responsive to receiving the PIM JOIN for the (S,G), determine whether the PIM JOIN is intended for a multicast source (e.g., MS 130) that is reachable through the BIER domain 113 (e.g., the multicast source is located on a disjoint PIM domain 112 that is reachable through the BIER domain 113) and, if so, attempt to resolve the multicast source via an EBBR 115-B that is closest to or near the multicast source. For example, the IBBR 115-B may (a) attempt to find a route to the multicast source (e.g., MS 130), (b) if a route to the multicast source is found, check whether the multicast source is reachable via the BIER domain 113, and (c) if the multicast source is reachable via the BIER domain 113, find the EBBR on the path toward the multicast source and signal the request by the multicast host to join the (S,G) to the EBBR (e.g., using a PIM JOIN or using any other suitable signaling format). In the example of FIG. 1, the route to the multicast source is assumed to be an IGP route. The BBRs 115-B (operating as IBBRs) also may be configured to configure themselves to become the BFERs for the multicast data traffic that will be received from the multicast source for delivery to the multicast host. It is noted that these and various other functions supported by the BBRs 115-B are discussed further below.

The IBBR 115-B that receives the PIM JOIN for the (S,G) may attempt to find the route to the multicast source in a number of ways. As noted above, the route to the multicast source is assumed to be an IGP route. The IBBR 115-B that receives the PIM JOIN for the (S,G) may attempt to find the route to the multicast source based on computation of a shortest path first (SPF) path by the IGP. The SPF path to the multicast source may identify the BIER routers 115 on the SPF path to the multicast source, including the BIER router 115 closest to the multicast source.

The IBBR 115-B that receives the PIM JOIN for the (S,G) may attempt to find the EBBR 115-B on the path toward the multicast source in a number of ways. The manner in which a IBBR 115-B finds the EBBR 115-B on the path toward the multicast source may depend on whether the BIER domain 113 is commensurate with the IGP area (as illustrated by IGP area 111-A) or whether the BIER domain 113 is only a portion of the IGP area (as illustrated by IGP area 111-S).

The IBBR 115-B that receives the PIM JOIN for the (S,G), when the BIER domain 113 is commensurate with the IGP area (as illustrated by IGP area 111-A), may find the EBBR 115-B on the path toward the multicast source based on IGP (namely, the BIER router 115 closest to the multicast source, which is the BFIR in the path from the multicast source, is the EBBR). In this case, since the BIER domain 113 is commensurate with the IGP area 111-A, the border router (e.g., ABR or ASBR) of the IGP area 111-A is the BIER router 115 closest to the multicast source (the PIM router 114-2 on the path to the multicast source is not part of the IGP area 111) and, thus, is the EBBR. The IBBR 115-B that receives the PIM JOIN for the (S,G) determines the EBBR on the path toward the multicast source by determining the ABR or ASBR which summarized the route to the multicast source and leaked it into the IGP area 111-A (and, thus, into the BIER domain 113). The IBBR 115-B that receives the PIM JOIN for the (S,G) may determine the ABR or ASBR which summarized the route to the multicast source and leaked it into the IGP area 111-A (and, thus, into the BIER domain 113) by determining source information identifying the ABR or ASBR which summarized the route to the multicast source and leaked it into the IGP area 111-A (and, thus, into the BIER domain 113). The source information may include the advertising router identifier (advertising router-id) of the ABR or ASBR (which is typically the address of the ABR or ASBR), which may be determined based on the prefix (namely, determining the advertising router identifier associated with the prefix). The source information may include other information suitable for use in identifying the ABR or ASBR which summarized the route to the multicast source and leaked it into the IGP area 111-A (and, thus, into the BIER domain 113). It is noted that this enables the BIER domain 113 to be commensurate with the IGP area 111-A.

The IBBR 115-B that receives the PIM JOIN for the (S,G), when the BIER domain 113 is only a portion of the IGP area (as illustrated by IGP area 111-S), may find the EBBR 115-B on the path toward the multicast source based on the SPF path (namely, the BIER router 115 closest to the multicast source, which is the BFIR in the path from the multicast source, is the EBBR). In this case, the process of resolving the multicast source based on the SPF calculation also returns the EBBR that is in the path to the multicast source. When the SPF path to the multicast source is computed by the IGP, the BIER routers 115 on the path to the multicast source are tracked. The IGP may find the EBBR on the path toward the multicast source by determining the last BIER router 115 on the path toward the multicast source (illustratively, although the PIM router 114-2 may be the last router in the IGP area 111-S that is on the path toward the MS 130, the BBR 115-B3 is the last BIER router 115 in the IGP area 111-S that is on the path toward the MS 130 and, accordingly, will be the EBBR on the path toward the multicast source for the PIM JOIN that is being propagated). The IGP may find the EBBR on the path toward the multicast source by distinguishing between BIER routers 115 and non-BIER routers (illustratively, PIM routers 114) on the path toward the multicast source (again, identifying the BBR 115-B3, rather than PIM router 114-2, as being the last BIER router 115 in the IGP area 111-S that is on the path toward the MS 130). The IGP may determine that a router is a BIER router 115, as opposed to a non-BIER router, based on a determination that the router originated BIER type-length-values (TLVs) in the IGP. It is noted that this obviates the need for the BBRs 115 to be IGP ABRs, thereby enabling the BIER domain 113 to be carved out as a BIER sub-domain within the IGP area 111-S.

It is noted that, if multiple Equal Cost Multiple Path (ECMP) paths toward the multicast source (to multiple potential EBBRs) are identified, one of the multiple potential EBBRs may be selected (e.g., selecting one of the multiple potential EBBRs randomly, selecting one of the multiple potential EBBRs that has the lowest System Id, or the like) as the EBBR to which the join for the (S,G) is signaled.

The BBR 115-B that receives the PIM JOIN for the (S,G), in addition to finding the EBBR on the path toward the multicast source, may determine the BFR-ID of the EBBR (e.g., based on flooding of the BFR-ID by the IGP using the IGP BIER extension as defined in the ISIS/OSPF standards).

The IBBR 115-B that receives the PIM JOIN for the (S,G) and identifies the EBBR for the PIM JOIN configures itself to become the BFER for the multicast data traffic of the multicast source that will be received from the BFIR via the BIER domain 113. The IBBR 115-B creates a stitching in which it sets up a multicast route entry (or multicast state) to process the multicast data traffic in the traffic direction. The multicast route entry has an incoming interface identifying the interface of the IBBR 115-B on which the multicast data traffic is received (this is a BIER "tunnel" interface on which the indication of the request by the multicast host to join the (S,G) is to be signaled, which is an interface into the BIER domain 113) and an outgoing interface identifying the interface of the IBBR 115-B on which the multicast data traffic is sent (this is the interface on which the PIM JOIN was received, which is an interface into the PIM domain 112-2). It is noted that, if the IBBR 115-B receives another PIM JOIN for the same multicast (S,G) on a different interface of the IBBR 115-B, that interface is added to the outgoing interface list of the multicast route entry and the BRT is populated accordingly. It is noted that, in this manner, the IBBR 115-B will track all its PIM interfaces that are interested in the group (G) specified in the (S,G) and create multicast states for all PIM routers that attach to it (in the manner discussed above).

The IBBR 115-B that receives the PIM JOIN for the (S,G) and identifies the EBBR for the PIM JOIN, signals an indication of the request by the multicast host to join the (S,G) via the BIER domain 113 using a BIER tunnel (which also may be referred to as stitching the PIM signaling via the BIER domain 113). The IBBR 115-B may signal the indication of the request by the multicast host to join the (S,G) using a control message that is indicative of the request by the multicast host to join the (S,G). This control message may be referred to as a join message as it is indicative of the request by the multicast host to join the (S,G). The join message that is indicative of the request by the multicast host to join the (S,G) may be a PIM control message (e.g., a PIM JOIN indicative of a request by the multicast host to join the (S,G)) or other suitable type of control message that is indicative of the request by the multicast host to join the (S,G). The IBBR 115-B, when using a PIM control message to signal the request by the multicast host to join the (S,G), may reuse the PIM JOIN for the (S,G) that is received or may generate a new PIM JOIN for the (S,G) based on the PIM JOIN for the (S,G) that is received. The IBBR 115-B, when not using a PIM control message to signal the request by the multicast host to join the (S,G), may generate the join message based on the PIM JOIN for the (S,G), that is indicative of the request by the multicast host to join the (S,G), that was received. The IBBR 115-B sends the join message that is indicative of the request by the multicast host to join the (S,G) using a BIER packet configured for tunneling the join message via the BIER domain 113. 115-B The BIER packet includes a BIER payload and a BIER header. The BIER payload includes the join message that is indicative of the request by the multicast host to join the (S,G). The BIER header includes a number of parameters which are set in a manner supporting tunneling of the join message that is indicative of the request by the multicast host to join the (S,G) from the BBR 115-B that is the IBBR to the BBR 115-B that is the EBBR. The BIER header includes a BFIR identifier parameter that identifies the IBBR that is originating the BIER packet (e.g., a BFIR-ID parameter, which may be denoted as BIERHeader.BFIR-ID, which includes the BFR-ID of the IBBR that is originating the BIER packet), a BFER identifier parameter that identifies the EBBR that is the tunnel termination point for the BIER packet (e.g., a Bit-String parameter, which may be denoted as BIERHeader.BitString, which is set in a manner identifying the EBBR that is the tunnel termination point for the BIER packet, such as by setting a bit of a bit position associated with the BFR-ID of the EBBR), and a protocol parameter that identifies the protocol of the message being tunneled (e.g., a protocol parameter, which may be denoted as BIERHeader.Proto, which is set in a manner indicative that the protocol of the message being tunneled is PIM). The BIER header may include one or more additional parameters, which may be based on the network (e.g., MPLS versus non-MPLS), capabilities (BSL), network configuration, or the like, as well as various combinations thereof. An example of the BIER header format is presented with respect to FIG. 2. The BBR 115-B that is the IBBR, after constructing the BIER packet, sends the BIER packet via the BIER domain 113.

The BCR 115-C uses the BIER procedures (e.g., based on the draft-ietf-bier-architecture) to forward the BIER packet through the BIER domain 113. The join message that is being transported via the BIER tunnel remains encapsulated within the BIER packet and, as such, the BCR 115-C does not examine the join message and, therefore, no multicast state is stored within the BIER domain 113. The BIER packet is forwarded through the BIER domain 113 until it reaches the BBR 115-B having a BFR-ID that matches the BFR-ID indicated in the Bit-String parameter of the BIER header of the BIER packet (namely, the BBR 115-B that is the EBBR).

The BBR 115-B that receives a BIER packet, transporting a join message via a BIER tunnel through the BIER domain 113 where the join message is indicative of a PIM JOIN message being signaled through the BIER domain 113, is the EBBR 115-B for the join message (and, thus, for the PIM JOIN message being signaled through the BIER domain 113).

The BBR 115-B that is the EBBR is configured to determine that the BIER packet is transporting a join message indicative of a PIM JOIN message being signaled through the BIER domain 113. The EBBR 115-B examines the BIER header of the BIER packet and determines that it is the intended destination of the BIER packet (e.g., that its own BFR-ID matches the BFR-ID indicated in the Bit-String parameter of the BIER header of the BIER packet). The EBBR 115-B examines the BIER header of the BIER packet and determines that the BIER packet is transporting a PIM-related control message (e.g., based on the protocol parameter, BIERHeader.Proto, being set in a manner indicative that the join message that is being tunneled is a PIM-related control message that is tunneled responsive to receipt of a PIM control message by the IBBR 115-B). The EBBR 115-B, based on the determination that the BIER packet is transporting a PIM-related control message, knows that additional processing is needed (e.g., terminating the BIER tunnel for the join message and sending a corresponding PIM JOIN message toward the multicast source, creating multicast state for handling of multicast data traffic, and so forth).

The EBBR 115-B terminates the BIER tunnel for the join message and sends a corresponding PIM JOIN toward the multicast source. The EBBR 115-B decapsulates the join message from within the BIER packet. The EBBR 115-B removes the BIER header from the BIER packet. The EBBR 115-B extracts the join message from the BIER payload of the BIER packet. The EBBR 115-B determines the route to the multicast source, which includes a PIM router 114 with which the multicast source is associated (illustratively, PIM router 114-2 with which the MS 130 is associated). The EBBR 115-B verifies that the multicast source is on a local attached PIM domain of the EBBR 115-B (illustratively, PIM domain 112-1). The EBBR 115-B, based on a determination that the multicast source is on a local attached PIM domain of the EBBR 115-B, sends a corresponding PIM JOIN message, indicative of the request by the multicast host to join the (S,G), toward the PIM router 114 with which the multicast source is associated via the associated PIM domain (illustratively, toward PIM router 114-2 of the PIM domain 112-1). The join message that is received within the BIER payload of the BIER packet may be a PIM control message (e.g., a PIM JOIN indicative of the request by the multicast host to join the (S,G)) or other suitable type of control message that is indicative of the request by the multicast host to join the (S,G). The EBBR 115-B, when the join message that is received within the BIER payload of the BIER packet is a PIM JOIN message, may reuse the PIM JOIN message that is received within the BIER payload of the BIER packet or may generate a new PIM JOIN message for the (S,G) based on the PIM JOIN message for the (S,G) that is received within the BIER payload of the BIER packet. The EBBR 115-B, when the join message that is received within the BIER payload of the BIER packet is not a PIM JOIN message, generates a PIM JOIN message for the (S,G), based on the join message that is received within the BIER payload of the BIER packet, indicative of the request by the multicast host to join the (S,G). The EBBR 115-B, as noted above, sends the PIM JOIN message indicative of the request by the multicast host to join the (S,G) toward the PIM router 114 with which the multicast source is associated via the associated PIM domain (again, toward PIM router 114-2 of the PIM domain 112-1).

The EBBR 115-B configures itself to become the BFIR for the multicast data traffic that will be received from the multicast source. The EBBR 115-B creates a stitching in which it sets up multicast state (e.g., a multicast route entry) to process the multicast data traffic in the traffic direction. The multicast state has an incoming interface identifying the interface of the BBR 115-B on which the multicast data traffic is received (this is the interface on which the PIM JOIN message is sent toward the multicast source, which is an interface from the PIM domain 112-1) and an outgoing interface identifying the interface of the EBBR 115-B on which the multicast data traffic is sent (this is a BIER "tunnel" interface via which the BIER packet was received, which is an interface into the BIER domain 113). The multicast state also may include information identifying the BFER of the BIER tunnel for the multicast data traffic for that multicast host (e.g., using the BIER-Header.BFIR-ID to identify the BFER of the BIER tunnel for the multicast data traffic).

The EBBR 115-B configures itself to become the BFIR for the multicast data traffic that will be received from the multicast source. The EBBR 115-B builds a BIER reverse path forwarding (RPF) table (BRT) that will be used by the BFIR for data path forwarding. The EBBR 115-B builds the BRT using (1) the (S,G) specified in the PIM JOIN (e.g., the Group (G) address) and (2) the BFIR-ID of the IBBR 115-B which originated the BIER packet including the join message (which is specified in the BIERHeader.BFIR-ID field of the BIER header of the BIER packet), such that the multicast data traffic can follow the reverse path back to the IBBR which originated the BIER packet. It is noted that a multicast group (G) may be associated with multiple IBBRs 115-B (e.g., where multiple MVPN leaf routers behind the BIER domain 113 are interested in the same multicast group G, but reachable via different IBBRs 115-B), in which case the single multicast group (G) may appear in multiple entries of the BRT that are associated with the multiple IBBRs/BFERs).

It is noted that the EBBR 115-B may also maintain additional information which may be used to support forwarding of multicast data traffic along the reverse path back to the IBBR 115-B which originated the BIER packet. For example, the EBBR 115-B may maintain a Bit Index Routing Table (BIRT), which is a table that maps from the BFR-ID of a BFER to the BFR-prefix of that BFER and to the BFR-NBR on the path to that BFER. For example, the EBBR 115-B may maintain a Bit Index Forwarding Table (BIFT), which may be derived from the BIRT and which is used to map from the BFR-ID of a BFER to the corresponding F-BM and BFR-NBR. The EBBR 115-B also may maintain other types of additional information which may be used to support forwarding of multicast data traffic along the reverse path back to the IBBR 115-B which originated the BIER packet.

It is noted that the arrangement of the BRT and BIFT on an EBBR 115-B may be better understood by way of an example. For example, consider a network in which a first MH A joins (S,G1) and (S,G2), a second MH C joins (S,G1) and (S,G3), and a third MH E joins (S,G3). In this example, the BRT may be as presented in Table 1A and the BIFT may be as presented in Table 1B.

TABLE 1A

| GROUP | IBBR |
|---|---|
| (G1) | C, A |
| (G2) | A |
| (G3) | E, C |

TABLE 1B

| BFR-ID (SI:Bitstring) | BFR-NBR |
|---|---|
| 1 (0:0001) | C |
| 3 (0:0100) | E |
| 4 (0:1000) | A |

As such, a multicast data packet arriving with destination G1 will have the BITs (0:1001) (based on a combination of the entries of the BIFT associated with C and A) and a packet arriving with a destination of G3 will have the BITs of (0:0101) (based on a combination of the entries of the BIFT associated with C and E).

It is noted that, if the EBBR 115-B receives another join message for the same multicast (S,G) on a different interface of the EBBR 115-B, that interface is added to the incoming interface list of the multicast route entry and the BRT is populated accordingly. It is noted that, in this manner, the EBBR 115-B will track all of its BIER interfaces associated with IBBRs that are interested in the group (G) specified in the (S,G) and create multicast states for all BIER interfaces via which join messages are received (in the manner discussed above).

The PIM router 114 that is associated with the multicast source (illustratively, PIM router 114-2 associated with MS 130) receives the PIM JOIN from the EBBR 115-B. The PIM router 114 that is associated with the multicast source processes the PIM JOIN to complete the end-to-end multicast traffic flow setup.

The CN 110, upon establishment of the end-to-end multicast traffic flow of the (S,G) for the MH 120, may then support delivery of multicast data traffic of the (S,G) from the MS 130 to the MH 120 (as well as to any other MHs configured to receive multicast data traffic of the (S,G)).

The PIM router 114 that is associated with the multicast source (illustratively, PIM router 114-2 associated with MS 130) receives multicast data traffic from the multicast source for the multicast group (i.e., the (S,G)). The PIM router 114 that is associated with the multicast source sends the multicast data traffic to the BBR 115-B that is the BFIR for the (S,G).

The BBR 115-B that is the BFIR for the (S,G) receives the multicast traffic from the PIM router associated with the multicast source. The BBR 115-B that is the BFIR for the (S,G) tunnels the multicast data traffic through the BIER domain, based on BIER, to the BFER for the (S,G). The BBR 115-B that is the BFIR for the (S,G) tunnels the multicast data traffic through the BIER domain based on the BRT at the BFIR and, in some cases, also based on the BIFT at the BFIR.

The BBR 115-B that is the BFIR for the (S,G) receives a multicast data packet of the multicast traffic from the PIM router associated with the multicast source and provides the multicast data packet to the BIER domain 113, for delivery to any interested BFER(s), based on BIER. The BBR 115-B that is the BFIR for the (S,G) finds the group address for the multicast group of the (S,G), which may be considered to be the destination IP of the multicast data traffic, in the BRT at the BFIR. The BBR 115-B that is the BFIR for the (S,G) (1) finds, from the BRT at the BFIR, each of the BFERs (IBBRs) that are interested in the multicast group (which, illustratively, is the BBR 115-B4) and (2) finds, for each of the interested BFER(s) from the BIFT at the BFIR, the BFR-ID of the interested BFER. In this manner, for an interested BFER, the combination of the BRT and the BIFT is such that the BFR-ID of the interested BFER (and, thus, the associated bit index of the interested BFER) may be identified.

The BBR 115-B that is the BFIR for the (S,G) constructs a BIER packet to transport the multicast data packet via the BIER domain 113. The BBR 115-B that is the BFIR for the (S,G) may form a BIER packet including the multicast data packet by encapsulating the multicast data packet within a BIER payload of the BIER packet and generating a BIER header for the BIER packet. It will be appreciated that the BIER header includes, among other parameters, the Bit-String parameter, denoted as BIERHeader.BitString, which is constructed so as to encode therein the interested BFER(s) such that the multicast data packet can be delivered to the interested BFER(s). As noted above, an example of the BIER header format is presented with respect to FIG. 2.

The BBR 115-B that is the BFIR for the (S,G) then provides the BIER packet, which includes the multicast data packet, to the BIER domain 113 for delivery to the interested BFER(s) based on BIER.

The BBR 115-C uses the BIER procedures to forward the BIER packet through the BIER domain 113. The multicast data packet that is being transported via the BIER domain 113 remains encapsulated within the BIER packet and, as such, the BBR 115-C does not examine the multicast data packet. The BIER packet is forwarded through the BIER domain 113 until it reaches each of the interested BFER(s); namely, any BBR 115-B having a BFR-ID that matches a BFR-ID indicated in the Bit-String parameter of the BIER header of the BIER packet (which, in this case, at least includes BBR 115-B4).

The BBRs 115-B that are the interested BFER(s) accept the BIER packets including the multicast data packets of the multicast traffic and forward the multicast data packets of the multicast traffic. The BBRs 115-B that are the interested BFER(s) extract the multicast data packets of the multicast traffic from the BIER packets and forward the multicast data packets. The BBRs 115-B that are the interested BFER(s) forward the multicast data packets of the multicast traffic based on the multicast route entries available at the BBRs 115-B that are the interested BFER(s), which map the incoming interfaces of the BBRs 115-B over which the BIER packets are received to the outgoing interfaces of the BBRs 115-B via which the multicast data packets of the multicast traffic are forwarded. The multicast data packets of the multicast traffic are forwarded back into the PIM domain (illustratively, PIM domain 112-2) for delivery to PIM router 114 associated the multicast host for which the multicast data packets of the multicast traffic are intended.

The PIM router 114 that is associated with the multicast host (illustratively, PIM router 114-3 associated with MH 120) receives the multicast data traffic from the BIER domain 113 (illustratively, from the BBR 115-B4). The PIM router 114 that is associated with the multicast host sends the multicast data traffic to the multicast host.

The communication system 100, as described herein, is configured to support use of BIER in a core network to support stitching of legacy PIM access networks. The operation of the communication system 100 in supporting use of BIER in a core network to support stitching of legacy PIM access networks may be further understood by way of a description of an example by which MH 120 receives multicast data traffic from the MS 130 via CN 110. As discussed herein the routers P1, P2, P3, P4, and P5 form the BIER domain 113 and PE1, PE2, PE3, and PE4 are legacy PIM routers and are IGP ABRs. In the example, the Bit String Length (BSL) is assumed to be 256. The BIER routers have BFR-IDs assigned as follows (BFR-IDs in parentheses): P1 (1), P2 (2), P3 (3), P4 (4), and P5 (5). The MH 120 sends an IGMP JOIN to PE4 to receive traffic from the multicast channel (S1, G1). PE4 is a legacy PIM router. PE4 creates a PIM entry for (S1,G1) and finds out the route to source S1. The route to source S1 has a next-hop of P4. PE4 originates a PIM JOIN toward P4. P4 receives the PIM JOIN from PE4. P4 checks the route to source S1. The route to source S1 has a next-hop of P5, which is in the BIER domain 113. P4 finds the EBBR of the route to source S1, which is P3. P4 finds the BFR-ID of P3 (it is noted that the BFR-ID and BFR-prefix are flooded by the IGP protocols). P4 encapsulates the PIM JOIN in BIER (namely, within a BIER packet) for signaling of the PIM JOIN via the BIER domain 113. The BIER header of the BIER packet is set as follows:

BIERHeader.BSL=256
BIERHeader.Proto=PIM

BIERHeader.BFIR-ID=4
BIERHeader.Bitstring[1 . . . 7]=00000000000000000000000000000000
BIERHeader.Bitstring[8] =00000000000000000000000000000100

In the BIERHeader.Bitstring[8], it is noted that the third bit is set (one) and all of the other bits are clear (zero). P4 then sends the BIER packet in the BIER domain 113. As a result of the BIERHeader.Bitstring, P3 ultimately receives the BIER packet and processes the encapsulated PIM JOIN. P3 creates an (S1,G1) entry, adds P4 to the receiver list of (S1,G1), and originates a PIM JOIN on the P3-PE2 interface (RPF). PE2 receives the PIM JOIN and creates a PIM state and (S1,G1) entry with the incoming interface connected to the multicast source and the outgoing interface set as PE2-P3. The source S1 sends multicast data traffic. PE2 forwards the multicast data traffic to P3 (outgoing interface). P3 encapsulates the multicast data traffic based on BIER and sends the encapsulated multicast data traffic in the BIER domain 113 (with the BitString set to include the BFR-ID of P4). The encapsulated multicast data traffic is delivered, by the BIRE routers, to P4. P4, which is the BFER for the multicast data traffic, receives the encapsulated multicast data traffic, identifies PE4 from the outgoing interface list, and sends the multicast data traffic to PE4. PE4 sends the multicast data traffic to the MH 120. In this manner, the MH 120 which requested to receive the multicast data traffic is able to join the multicast group and receive the multicast data traffic of the multicast group from the MS 130.

It will be appreciated that, although primarily described above with respect to handling of PIM JOIN messages, PIM PRUNE messages may be handled in a similar manner. The BBRs 115-B are configured to support signaling of PIM PRUNE messages via the BIER domain 113 via BIER tunnels. For example, the BBR 115-B that is the IBBR, responsive to receiving a PIM PRUNE for an (S,G) that is indicative of a request by a multicast host to leave the (S,G), may perform various functions such as sending a control message indicative of the request by the multicast host to leave the (S,G) (which may be referred to as a prune message) via the BIER domain 113 using a BIER packet, updating multicast state, and so forth. For example, the BBR 115-B that is the EBBR, responsive to receiving the BIER packet including the prune message indicative of the request by the multicast host to leave the (S,G), may perform various functions such as sending a PIM PRUNE indicative of the request by the multicast host to leave the (S,G), updating multicast state, and so forth. It will be appreciated that other types of PIM control messages may be not be handled in a manner similar to the PIM JOIN and PRUNE messages, as the BBRs 115-B are configured to create PIM adjacency toward PIM domains 112 and are configured to terminate PIM adjacency toward the BIER domain 113 (e.g., only signaling multicast desire for joining and pruning through the BIER domain 113).

The communication system 100, as described herein, is configured to support use of BIER in a core network to support stitching of legacy PIM access networks. The communication system 100 also may be configured to support handling of various types of events which may occur when BIER is used within a core network to support stitching of legacy PIM access networks.

For example, the communication system 100 may be configured to support handling of an event in which the router identifier (router-id) of the EBBR changes from an old EBBR router-id to a new EBBR router-id. In this case, the IBBR may originate a join message for the (S,G) to the new EBBR router-id and a prune message for the (S,G) to the old EBBR router-id. The join message for the (S,G) and the prune message for the (S,G) will be tunneled across the BIER domain 113 as discussed herein.

For example, the communication system 100 may be configured to support handling of an event in which the MS 130 moves relative to the PIM domain 112-1 such that the EBBR of the (S,G) changes from an old EBBR having an old EBBR router-id to a new EBBR having a new EBBR router-id. In this case, the IBBR may originate a join message for the (S,G) to the new EBBR router-id of the new EBBR and a prune message for the (S,G) to the old EBBR router-id of the old EBBR. The join message for the (S,G) and the prune message for the (S,G) will be tunneled across the BIER domain 113 as discussed herein.

For example, the communication system 100 may be configured to support handling of the situation in which the EBBR does not receive prune messages indicative of PIM PRUNEs (network drops). In this case, the EBBR may run respective timers for the receivers in the receiver list in order to expire the receivers in the receiver list for the (S,G).

The communication system 100 may be configured to support use of BIER in a legacy PIM network by supporting various other functions or capabilities, support handling of various other types of events, or the like, as well as various combinations thereof.

Figure 2:
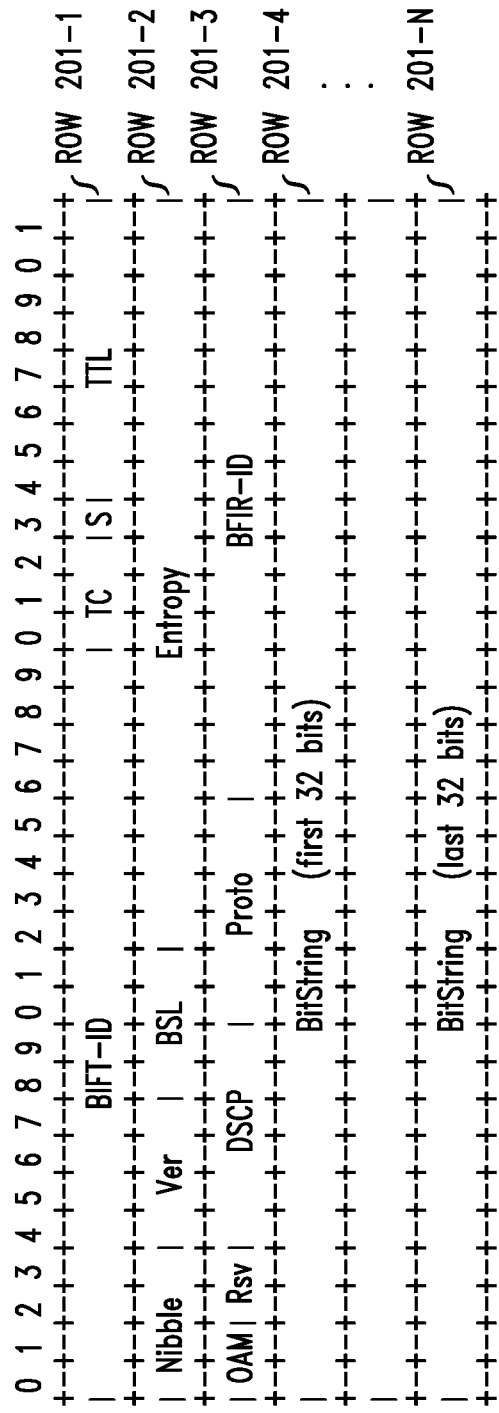
FIG. 2 depicts an example of a BIER header format for a BIER packet configured to support multicast based on BIER.

FIG. 2 depicts an example of a BIER header format for a BIER packet configured to support multicast based on BIER. As depicted in FIG. 2, the BIER header format 200 includes a number of fields organized in rows of four octets each. The first set of four octets (denoted as row 201-1) includes a 20-bit BIFT-Id field, a 3-bit traffic class (TC) field, a 1-bit S field, and an 8-bit time-to-live (TTL) field. The second set of four octets (denoted as row 201-2) includes a 4-bit nibble field, a 4-bit version field, a 4-bit bitstring length (BSL) field, and a 20-bit entropy field. The third set of four octets (denoted as row 201-3) includes a 2-bit operations, administration, and maintenance (OAM) field, a 4-bit version field, a 2-bit reserve (RSV) field, a 6-bit differentiated services code point (DSCP) field, a 6-bit protocol (PROTO) field, and a 16-bit BFIR-ID field. The remaining set(s) of octets (denoted as rows 201-4-201-N) include(s) the Bitstring field (illustratively, the first 32 bits are included in row 201-4 and the last 32 bits are included in row 204-N), which has a length indicated by the 4-bit BSL field. The various fields of the BIER header format 200 may be further understood by way of reference to the BIER architecture standard.

Figure 3:
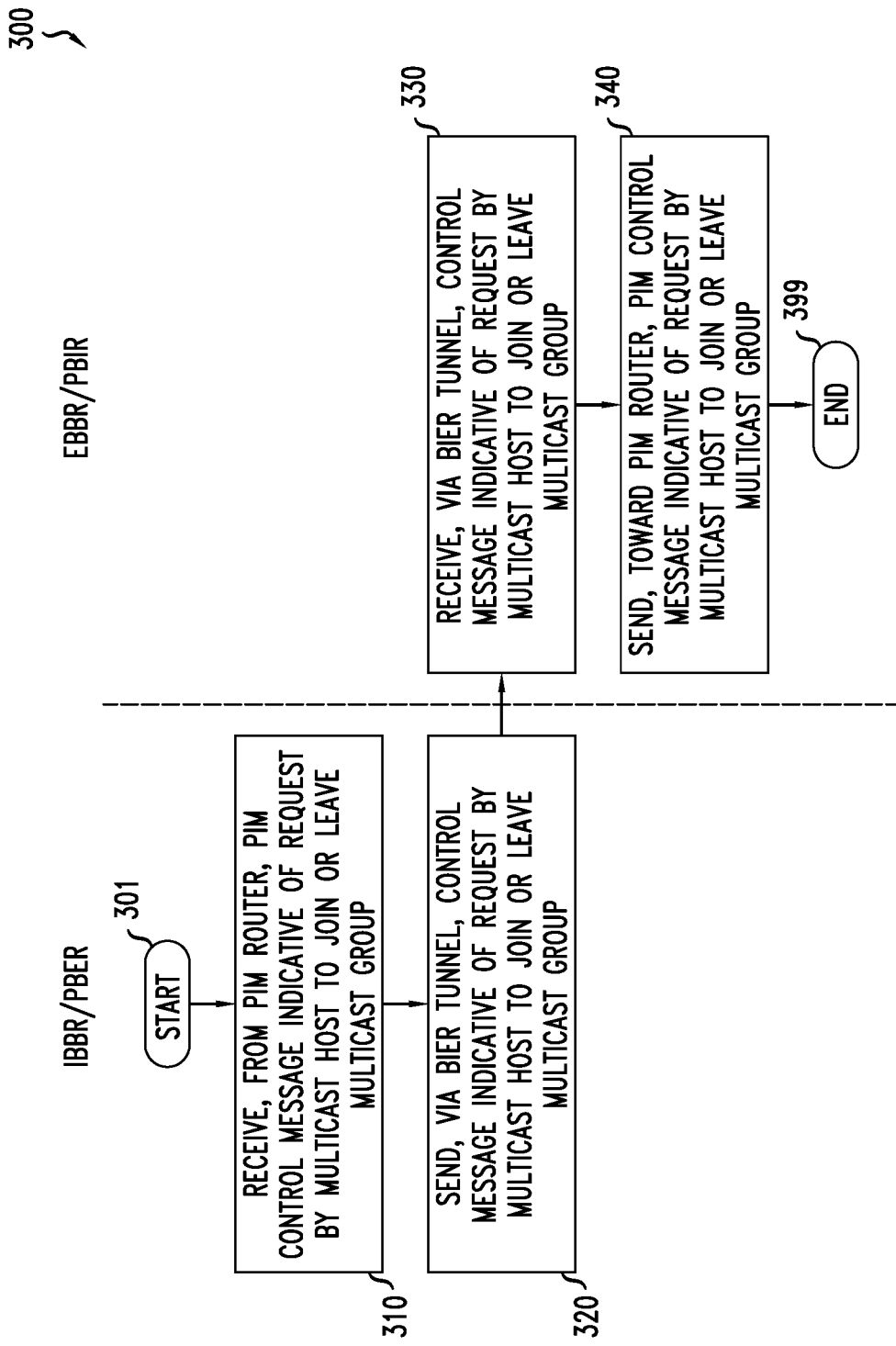
FIG. 3 depicts an embodiment of a method for supporting stitching of PIM access networks via a BIER core network.

FIG. 3 depicts an embodiment of a method for supporting stitching of PIM access networks via a BIER core network. The method 300 includes functions performed by the ingress and egress BBRs (denoted as the IBBR/PBER and the EBBR/PBIR) supporting stitching of PIM access networks via a BIER core network based on signaling of PIM control messages via a BIER tunnel. It will be appreciated that, although method 300 is primarily presented as being performed serially, at least a portion of the functions of method 300 may be performed contemporaneously or in a different order than as presented in FIG. 3.

At block 301, method 300 begins.

At block 310, the IBBR (which, as indicated, will also be the PBER for the multicast data traffic) receives, from a PIM router, a PIM control message indicative of a request by a multicast host to join or leave a multicast group. The PIM control message may be a PIM JOIN indicative of a request by the multicast host to the join the multicast group or a PIM PRUNE message indicative of a request by the multicast host to the leave the multicast group.

At block 320, the IBBR sends, via the BIER tunnel, a control message indicative of the request by the multicast host to join or leave the multicast group. The control message may be a PIM control message (e.g., a PIM JOIN indicative of a request by the multicast host to the join the multicast group or a PIM PRUNE message indicative of a request by the multicast host to the leave the multicast group) or other suitable type of control message. The control message may be the received PIM control message or may be generated based on the received PIM control message. The control message is sent via the BIER tunnel as part of a BIER packet.

At block 330, the EBBR (which, as indicated, will also be the PBIR for the multicast data traffic) receives, via the BIER tunnel, the control message indicative of the request by the multicast host to join or leave the multicast group. The control message, again, may be a PIM control message (e.g., a PIM JOIN indicative of a request by the multicast host to the join the multicast group or a PIM PRUNE message indicative of a request by the multicast host to the leave the multicast group) or other suitable type of control message. The control message is received via the BIER tunnel as part of a BIER packet.

At block 340, the EBBR sends, toward a PIM router, a PIM control message indicative of the request by the multicast host to join or leave the multicast group. The PIM control message may be the received control message or may be generated based on the control message. The PIM control message may be a PIM JOIN indicative of a request by the multicast host to the join the multicast group or a PIM PRUNE message indicative of a request by the multicast host to the leave the multicast group.

At block 399, method 300 ends.

Figure 4:
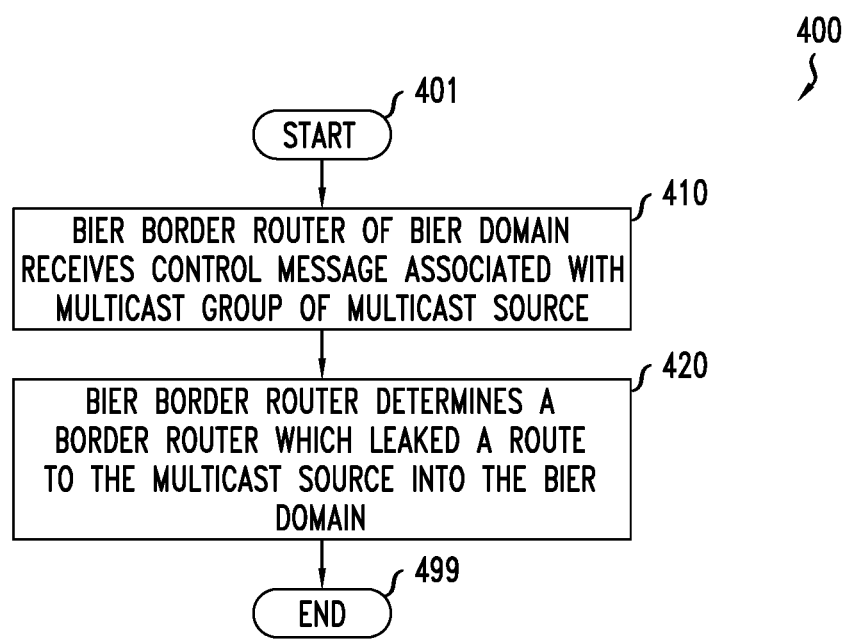
FIG. 4 depicts an embodiment of a method for identifying a BIER router that is a tunnel endpoint of a BIER tunnel of a BIER domain.

FIG. 4 depicts an embodiment of a method for identifying a BIER router that is a tunnel endpoint of a BIER tunnel of a BIER domain. The method 400 of FIG. 4 is performed by a BIER border router of the BIER domain, where the BIER domain is an IGP area. It will be appreciated that, although method 400 is primarily presented as being performed serially, at least a portion of the functions of method 400 may be performed contemporaneously or in a different order than as presented in FIG. 4. At block 401, method 400 begins. At block 410, the BIER border router of the BIER domain receives a control message associated with a multicast group of a multicast source. At block 420, the BIER border router determines an ABR which leaked a route to the multicast source into the BIER domain. The ABR is the tunnel endpoint of the BIER tunnel for the BIER domain. At block 499, method 400 ends.

Figure 5:
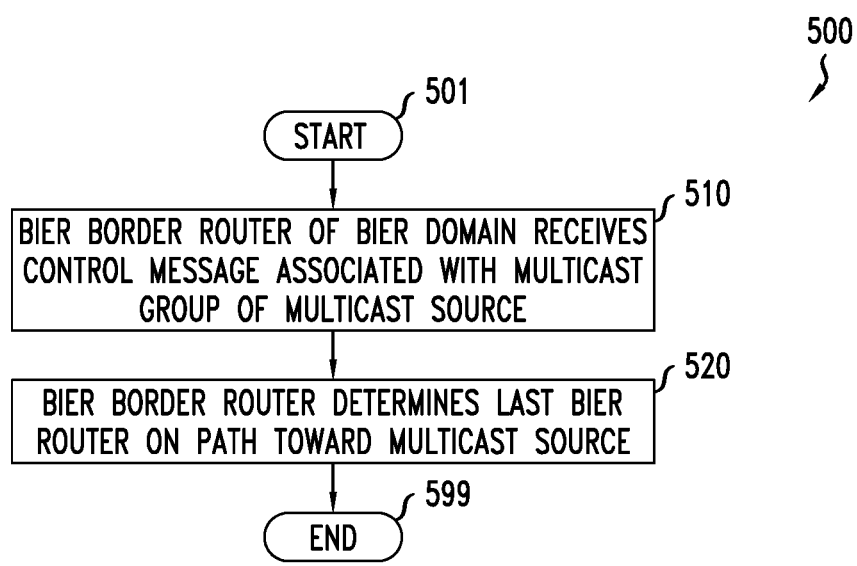
FIG. 5 depicts an embodiment of a method for identifying a BIER router that is a tunnel endpoint of a BIER tunnel of a BIER domain.

FIG. 5 depicts an embodiment of a method for identifying a BIER router that is a tunnel endpoint of a BIER tunnel of a BIER domain. The method 500 of FIG. 5 is performed by a BIER border router of the BIER domain, where the BIER domain is a portion of an IGP area. It will be appreciated that, although method 500 is primarily presented as being performed serially, at least a portion of the functions of method 500 may be performed contemporaneously or in a different order than as presented in FIG. 5. At block 501, method 500 begins. At block 510, the BIER border router receives a request associated with a multicast group of a multicast source. At block 520, the BIER border router determines a last BIER router on a path toward the multicast source. The last BIER router is the tunnel endpoint of the BIER tunnel for the BIER domain. At block 599, method 500 ends.

It will be appreciated that, although embodiments of the multicast capability are primarily presented herein within the context of a specific type of multicast (namely, source-specific multicast), various embodiments of the multicast capability may be used for various other types of multicast (e.g., any-source multicast or the like). In the case of PIM ASM, for example, the procedure for a leaf to join the multicast source or rendezvous point (RP) may be the same as discussed herein for PIM; however, the unicast (source registration) traffic from the source to the RP will be flooded through the BIER domain as regular unicast traffic without BIER involvement.

It will be appreciated that various embodiments of the multicast capability may be used in conjunction with Draft Rosen MVPN. Draft Rosen MVPN has evolved with many different types of signaling (e.g., with Administrative Distance (AD) and Customer-Multicast (C-MCAST) signaling of PIM or C-MCAST of PIM and AD of BGP). Various embodiments of the multicast capability may be used in conjunction with Draft Rosen MVPN as long as the C-MCAST signaling is done via PIM. The provider PIM for MVPN can be forwarded from the Root and LEAF PE with above explained mechanism. The multicast traffic can be forwarded via the Generic Routing Encapsulation (GRE) tunnel and the AD signaling can be done via MP-BGP.

Various embodiments of the multicast capability may provide various advantages or potential advantages. Various embodiments of the multicast capability enable service providers to avail themselves of the benefits of BIER by running a core network that supports BIER, thereby removing the multicast states (and, thus, the associated bottlenecks from the multicast states) from the core network and, as a result, supporting a scalable multicast solution. Various embodiments of the multicast capability enable service providers to utilize BIER without requiring the customers to upgrade their entire networks, providing the service providers with the flexibility to introduce BIER into their networks in various ways (e.g., targeting more important segments of their networks first and so forth). Various embodiments of the multicast capability enable greenfield deployment of BIER by service providers, which otherwise might not be possible for certain service providers (e.g., service providers that deploy traditional PIM multicast services in MVPN technology (e.g., which is the case for many service providers today), service providers that have more than 256 PEs in their network (e.g., in a typical tier one provider, the number of provider edge routers typically is well beyond 1000 routers), and so forth). Various embodiments of the multicast capability enable use of BIER sub-domains in a manner enabling support for more than 256 receivers by limiting each BIER sub-domain to no more than 256 receivers so as to prevent packet duplication which typically reduces network efficiency (e.g., by implementing BIER in the core, all of the core routers could be represented via the 256 bits available in the BIER header). Various embodiments of the multicast capability enable implementation of a stateless BIER core which can transport MVPN technology (e.g., by tunneling traditional MVPN technology through the BIER core). Various embodiments of the multicast capability may provide various other advantages or potential advantages.

Figure 6:
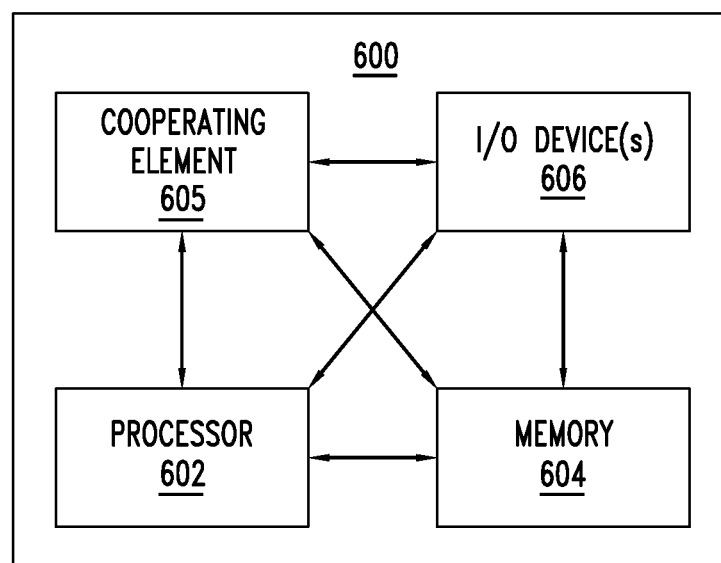
FIG. 6 depicts a high-level block diagram of a computer suitable for use in performing various functions presented herein.

FIG. 6 depicts a high-level block diagram of a computer suitable for use in performing various functions described herein.

The computer 600 includes a processor 602 (e.g., a central processing unit (CPU), a processor having a set of one or more processor cores, or the like) and a memory 604 (e.g., a random access memory (RAM), a read only memory (ROM), or the like). The processor 602 and the memory 604 are communicatively connected.

The computer 600 also may include a cooperating element 605. The cooperating element 605 may be a hardware device. The cooperating element 605 may be a process that can be loaded into the memory 604 and executed by the processor 602 to implement functions as discussed herein (in which case, for example, the cooperating element 605 (including associated data structures) can be stored on a non-transitory computer-readable storage medium, such as a storage device or other storage element (e.g., a magnetic drive, an optical drive, or the like)).

The computer 600 also may include one or more input/output devices 606. The input/output devices 606 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices or elements (e.g., a tape drive, a floppy drive, a hard disk drive, a compact disk drive, or the like), or the like, as well as various combinations thereof.

It will be appreciated that computer 600 of FIG. 6 may represent a general architecture and functionality suitable for implementing functional elements described herein, portions of functional elements described herein, or the like, as well as various combinations thereof. For example, computer 600 may provide a general architecture and functionality that is suitable for implementing one or more of a PIM router 114, a BIER router 115, MH 120, or MS 130.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including a set of instructions;
   wherein the set of instructions is configured to, when executed by the at least one processor, cause the apparatus to at least:
      receive, by an ingress Bit Index Explicit Replication (BIER) boundary router (IBBR) of a BIER domain, a control message associated with a multicast group of a multicast source; and
      determine, by the IBBR of the BIER domain, an egress BIER boundary router (EBBR) of the BIER domain associated with the multicast source.

2. The apparatus of claim 1, wherein the EBBR of the BIER domain is determined based on a determination that the control message is intended for a source reachable via the BIER domain.

3. The apparatus of claim 1, wherein the EBBR of the BIER domain is determined based on a shortest path first (SPF) path.

4. The apparatus of claim 1, wherein the EBBR of the BIER domain is determined based on a determination of a router which summarized a route to the multicast source.

5. The apparatus of claim 1, wherein the control message is indicative of a request by a multicast host to join or leave the multicast group, wherein the set of instructions is configured to, when executed by the at least one processor, cause the apparatus to at least:
   signal, by the IBBR of the BIER domain, an indication of the request by the multicast host to join or leave the multicast group.

6. The apparatus of claim 5, wherein, to signal the indication of the request by the multicast host to join or leave the multicast group, the set of instructions is configured to, when executed by the at least one processor, cause the apparatus to at least:
   send a BIER packet including a BIER header encapsulating the control message.

7. The apparatus of claim 6, wherein the BIER header includes:
   a Bit Forwarding Ingress Router Identifier (BFIR-ID) parameter including a Bit Forwarding Router Identifier (BFR-ID) of the IBBR of the BIER domain;
   a Bit String parameter having a set of bits set based on a Bit Forwarding Router Identifier (BFR-ID) of the EBBR of the BIER domain; and
   a protocol parameter indicative of a protocol of the control message.

8. The apparatus of claim 1, wherein the control message comprises a Protocol Independent Multicast (PIM) control message.

9. A non-transitory computer readable medium storing a set of instructions configured to, when executed by at least one processor, cause an apparatus to at least:
   receive, by an ingress Bit Index Explicit Replication (BIER) boundary router (IBBR) of a BIER domain, a control message associated with a multicast group of a multicast source; and
   determine, by the IBBR of the BIER domain, an egress BIER boundary router (EBBR) of the BIER domain associated with the multicast source.

10. The non-transitory computer readable medium of claim 9, wherein the EBBR of the BIER domain is determined based on a determination that the control message is intended for a source reachable via the BIER domain.

11. The non-transitory computer readable medium of claim 9, wherein the EBBR of the BIER domain is determined based on a shortest path first (SPF) path.

12. The non-transitory computer readable medium of claim 9, wherein the EBBR of the BIER domain is determined based on a determination of a router which summarized a route to the multicast source.

13. The non-transitory computer readable medium of claim 9, wherein the control message is indicative of a request by a multicast host to join or leave the multicast group, wherein the set of instructions is configured to, when executed by the at least one processor, cause the apparatus to at least:
 signal, by the IBBR of the BIER domain, an indication of the request by the multicast host to join or leave the multicast group.

14. The non-transitory computer readable medium of claim 13, wherein, to signal the indication of the request by the multicast host to join or leave the multicast group, the set of instructions is configured to, when executed by the at least one processor, cause the apparatus to at least:
 send a BIER packet including a BIER header encapsulating the control message.

15. The non-transitory computer readable medium of claim 14, wherein the BIER header includes:
 a Bit Forwarding Ingress Router Identifier (BFIR-ID) parameter including a Bit Forwarding Router Identifier (BFR-ID) of the IBBR of the BIER domain;
 a Bit String parameter having a set of bits set based on a Bit Forwarding Router Identifier (BFR-ID) of the EBBR of the BIER domain; and
 a protocol parameter indicative of a protocol of the control message.

16. The non-transitory computer readable medium of claim 9, wherein the control message comprises a Protocol Independent Multicast (PIM) control message.

17. A method, comprising:
 receiving, by an ingress Bit Index Explicit Replication (BIER) boundary router (IBBR) of a BIER domain, a control message associated with a multicast group of a multicast source; and
 determining, by the IBBR of the BIER domain, an egress BIER boundary router (EBBR) of the BIER domain associated with the multicast source.

18. The method of claim 17, wherein the EBBR of the BIER domain is determined based on a determination that the control message is intended for a source reachable via the BIER domain.

19. The method of claim 17, wherein the EBBR of the BIER domain is determined based on a shortest path first (SPF) path.

20. The method of claim 17, wherein the EBBR of the BIER domain is determined based on a determination of a router which summarized a route to the multicast source.

21. The method of claim 17, wherein the control message is indicative of a request by a multicast host to join or leave the multicast group, wherein the method includes:
 signaling, by the IBBR of the BIER domain, an indication of the request by the multicast host to join or leave the multicast group.

22. The method of claim 21, wherein signaling the indication of the request by the multicast host to join or leave the multicast group includes:
 sending a BIER packet including a BIER header encapsulating the control message.

23. The method of claim 22, wherein the BIER header includes:
 a Bit Forwarding Ingress Router Identifier (BFIR-ID) parameter including a Bit Forwarding Router Identifier (BFR-ID) of the IBBR of the BIER domain;
 a Bit String parameter having a set of bits set based on a Bit Forwarding Router Identifier (BFR-ID) of the EBBR of the BIER domain; and
 a protocol parameter indicative of a protocol of the control message.

24. The method of claim 17, wherein the control message comprises a Protocol Independent Multicast (PIM) control message.

* * * * *